H. T. SYKES.
GRAVEL MACHINE.
APPLICATION FILED OCT. 24, 1912.
1,104,576.
Patented July 21, 1914.
2 SHEETS—SHEET 1.
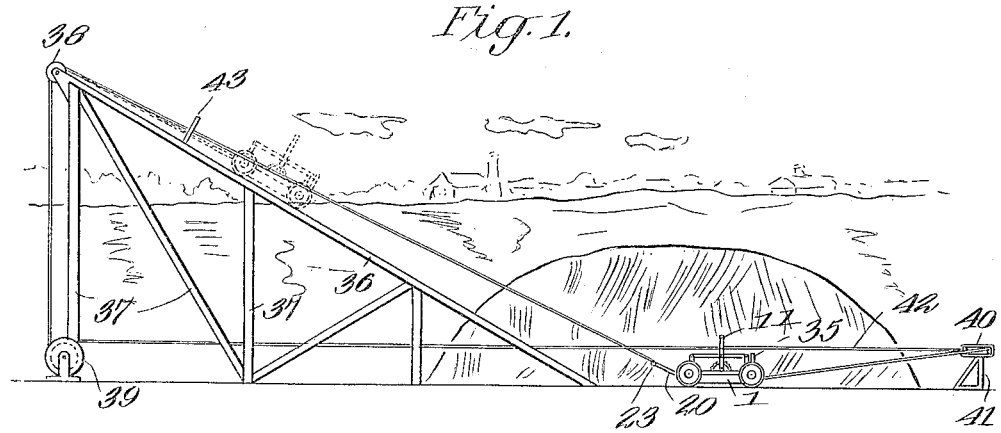
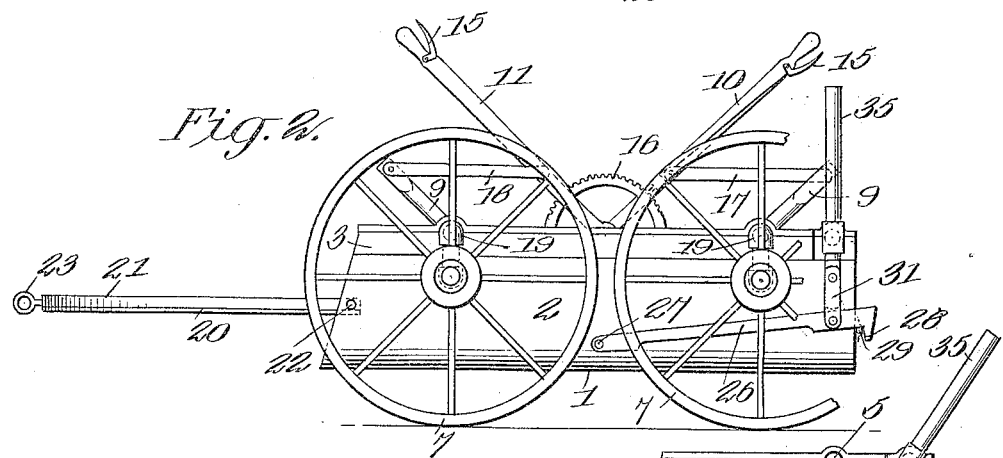
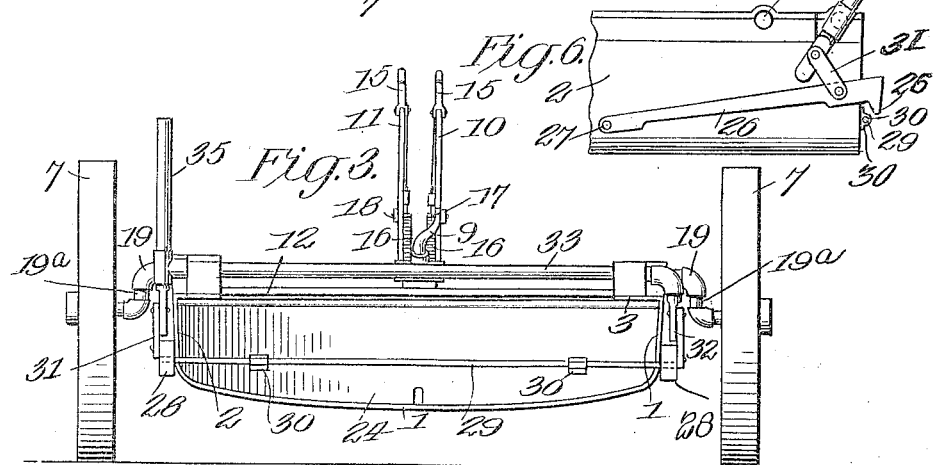
WITNESSES
Samuel E. Wade
O. E. Trainer
INVENTOR
HENRY T. SYKES
BY Munn & Co.
ATTORNEYS

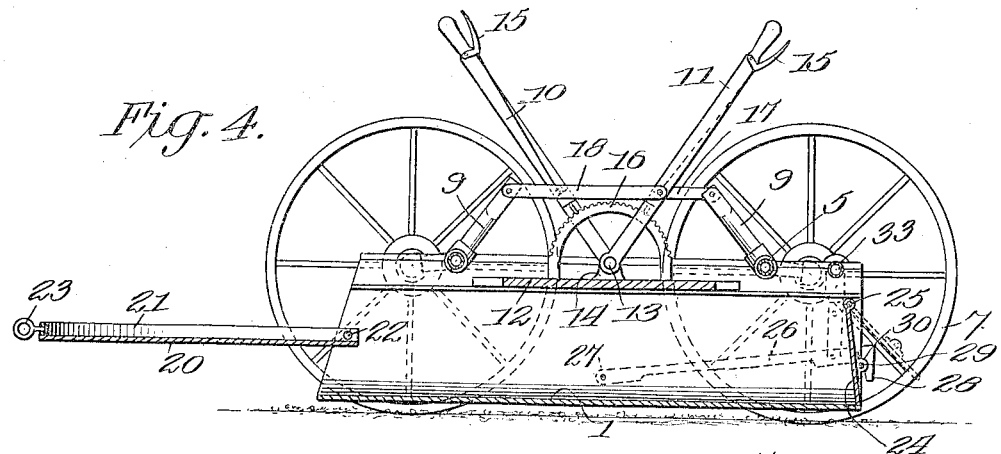
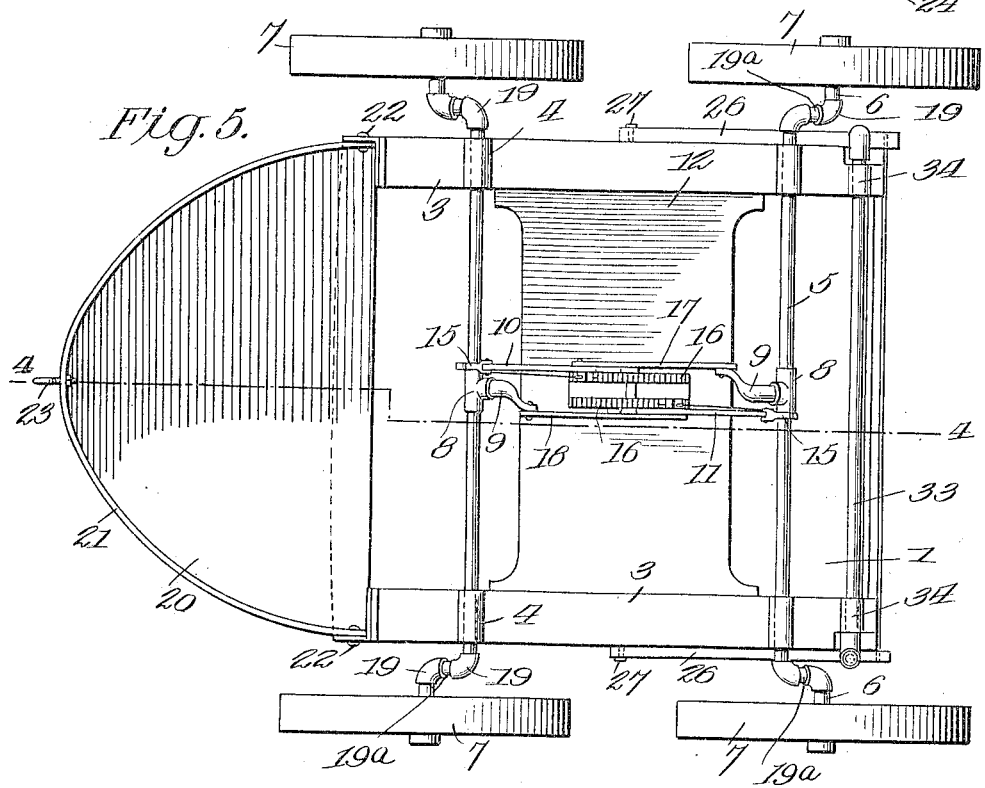

UNITED STATES PATENT OFFICE.

HENRY T. SYKES, OF NEW LONDON, MISSOURI, ASSIGNOR OF ONE-HALF TO A. VICTOR ELY, OF NEW LONDON, MISSOURI.

GRAVEL-MACHINE.

1,104,576.   Specification of Letters Patent.   Patented July 21, 1914.

Application filed October 24, 1912.   Serial No. 727,562.

*To all whom it may concern:*

Be it known that I, HENRY T. SYKES, a citizen of the United States, and a resident of New London, in the county of Ralls and State of Missouri, have invented certain new and useful Improvements in Gravel-Machines, of which the following is a specification.

My invention is an improvement in gravel machines, and has for its object the provision of a machine of the character specified, adapted to remove sand or gravel from a pit or holder, and to deposit it on board cars or other receptacles, so arranged that the device will load and unload itself, and wherein a dumping door is provided so arranged that it will automatically open when the machine reaches the dumping position, and automatically close as the machine returns to loading position.

A further object is to provide mechanism for preventing the machine from taking too large a load.

In the drawings: Figure 1 is a diagrammatic side view of the improved machine in operation; Fig. 2 is a side view of the machine; Fig. 3 is a rear view; Fig. 4 is a section on the line 4—4 of Fig. 5; Fig. 5 is a plan view; and, Fig. 6 is a detail of the latching mechanism for the rear door in a different position to that shown in Figs. 2 and 4.

The present embodiment of the invention comprises a scraper of substantial U-shape, and constructed of sheet material, the said material being bent to form a bottom 1 and sides 2, the bottom being arched downwardly slightly from side to side, and the sides being approximately parallel. Each side edge of the body is flanged inwardly at its upper end, as shown at 3, and bearings 4 are provided on the upper faces of the said flanges. Axles each consisting of a body 5 and laterally offset trunnions 6 are provided for supporting the body, each axle having its body journaled in bearings 4, transverse to the body, and wheels 7 are journaled on the spindles.

Each axle is provided at its center with a T 8, and an arm 9 is connected with the lateral branch of each T. A plate 12 is arranged transversely of the body between the flanges 3, and a stub shaft 13 is journaled on the plate at approximately the center thereof in lugs 14 on the plate. Levers 10 and 11 are connected with the ends of the shaft, and each lever is provided with a latch mechanism 15 for coöperating with a toothed segment 16 on the plate. The lever 10 is connected to the arm 9 of the rear axle by means of a link 17, and the lever 11 is connected to the arm 9 of the front axle by means of the link 18.

By means of the levers, the axles may be oscillated, to raise or lower the body with respect to the wheels. It will be evident that when the axles are oscillated to bring the spindles 6 out of the same horizontal plane with the bodies of the axles, the body of the machine will be raised or lowered, depending upon whether the said spindles are above or below the level of the body of the axle.

In the present construction, the axles and the spindles are of pipe, connected to each other by means of elbows 19, and a short section of pipe 19ª, and the T's 8 are arranged on the bodies at the center thereof. A draft plate is connected with the sides of the body, the said plate being arc-shaped and approximately semi-circular in form, and having a lateral upwardly extending flange 21 at its curved edge, the said flange being pivoted to the sides of the body by rivets 22, and an eyebolt 23 is connected with the flange at its center.

The front end of the body is open, and the rear end may be closed by means of the gate 24, hinged at 25 to the sides of the body, the said gate inclining downwardly and outwardly and resting against the bottom of the body when closed. A latch lever 26 is riveted to the outer face of each side of the body at one end, as shown at 27, and the free end of each lever is provided with a downwardly extending lug 28, for engaging the adjacent end of a rod 29 held in bearings 30 on the gate. Each latch lever has connected thereto near the outer end of the lever one end of a link 31, whose other end is pivoted to a lateral arm 32 on the adjacent end of a shaft 33 journaled in bearings 34 at the rear ends of the flanges 3. A lever 35 is connected to one end of the shaft 33, for oscillating the shaft to raise or lower the free ends of the latch levers, whereby to release the lugs 28 from the ends of the rod 29.

It will be evident that when the lever 35 is moved to oscillate the shaft 33, the latch levers 26 will be raised or lowered, depending upon the direction of movement of the lever. When the lever is moved into the position of Fig. 6, the latch levers are lifted at their free end to release the ends of the rod 29, and when the lever is in the position of Fig. 2, the latch levers are lowered into engagement with the ends of the rod to hold the gate closed.

In operation, the device may be arranged as shown in Fig. 1. An inclined trackway 36 is supported by suitable scaffolding 37, the lower end being at the point from which it is desired to lift the gravel, and the upper end being in position where a suitable receptacle, such as for instance a body or a car, may be arranged to receive the gravel. A pulley or sheave wheel 38 is journaled at the upper end of the trackway, and a reel 39 is arranged directly below the said pulley or sheave wheel. A second pulley or sheave wheel 40 is journaled at the opposite side of the loading place from the trackway on a suitable support 41, and a rope or cable 42 has its ends connected with the eye-bolt 23 and the rear end of the machine, as shown in the said figure. The central portion of the rope or cable 42 winds upon the reel 39, and it will be evident that when the reel is rotated, the machine will be moved toward the pulley 38, or toward the pulley 40, depending upon the direction of rotation of the reel. As the device moves toward the pulley 38, the front end of the body will scrape up or load gravel into the said body, the gravel piling against the gate 24. The depth at which the body will load is determined by the position of the levers 10—11. When the said levers are in the position of Fig. 2, the body is in its highest position, while when the levers are in the position of Fig. 4, the body is in such position that the bottom thereof is below the surface upon which the wheels move. When the lever 35 is in the position of Fig. 2, the latch levers are locked in closed position, since the links 31 are in alinement with the lever 35. Just as the machine reaches loading position, the said lever 35 is engaged by a stop 43 on the trackway, and the lever is thrown into the position of Fig. 6, lifting the latch levers 26 and releasing the gate. The load in the body is against the gate 24 on account of the inclined position of the body, and as soon as the gate is released, the material in the body forces the gate open, and the material is dumped from the body into the receiving vessel. The draft plate prevents the front end of the body from loading too deeply, since by the engagement of the said plate with the gravel or material to be loaded the front end of the scraper will be prevented from sinking too deep, being supported by the said plate. The latch levers 26 are rigidly secured to the sides of the scraper, and the said levers are normally in latching position, and by their resiliency they normally hold the lever 35 in the position of Fig. 2, and in position for engagement by the stop 43. This position of the latch levers and the lever 35 insures that the rear gate will not be released accidentally.

I claim:

1. A gravel machine, comprising a body substantially U-shaped in cross section and having open ends, axles journaled transversely of the ends of the body and at the upper edges of the sides thereof, each axle having laterally offset spindles at its ends, wheels on the ends of the axles, the body of each axle having a radial arm, a plate arranged transversely of the body at the center thereof and between the upper edges of the sides, levers pivoted to the plate, a link connecting each lever with the arm of the adjacent axle, and means for holding each lever in adjusted position.

2. A gravel machine, comprising a body substantially U-shaped in cross section and having open ends, axles journaled transversely of the ends of the body and at the upper edges of the sides thereof, each axle having laterally offset spindles at its ends, wheels on the ends of the axles, and an independent means connected with the body of each axle for oscillating the same to raise and lower the adjacent end of the body with respect to the wheels.

3. A gravel machine comprising a scraper of approximately U-shape in cross section and having open ends, a gate arranged transversely of the rear end of the scraper for closing said end, the gate being hinged at its upper edge to the scraper, a rod arranged transversely of the gate and extending beyond each end thereof, a resilient latch lever secured to the scraper at each side, each latch lever having a lug for engaging the adjacent end of the rod and standing normally out of engagement with the said end, and a common moving means for operating the latch levers to engage the lugs with the rod ends, said means comprising a shaft journaled transversely of the scraper and having a lateral arm at each end, a link connecting each arm with the adjacent latch lever, and a lever rigid with the shaft for oscillating the said shaft.

4. A gravel machine, comprising a scraper body, a gate hinged at its top to the body at the rear thereof, resilient latch levers secured to the scraper at each side thereof, each lever having a catch for engaging the gate to hold the same closed, said levers standing normally with the catches out of engagement with the gate, a shaft journaled on the scraper and having a lateral arm at each end, a link connecting each arm with the adjacent latch lever, and means for oscillating the lever, the latch levers being engaged with the gate when the links are in alinement with the arms of the shaft.

5. A gravel machine comprising a wheeled scraper, a gate for closing the rear end of the scraper, latching means normally out of engagement with the gate for holding the said gate closed, a shaft journaled on the scraper and having radial arms at its ends, links connecting the arms with the gate latching means, and a lever on the shaft and extending in the opposite direction from the arms, said latching means being held in closed position when the links are in alinement with the arms.

HENRY T. SYKES.

Witnesses:
J. W. PITT,
A. VICTOR ELY.

Copies of this patent may be obtained for five cents each, by addressing the "Commissioner of Patents, Washington, D. C."